(12) United States Patent
Wiebe

(10) Patent No.: US 9,481,204 B1
(45) Date of Patent: Nov. 1, 2016

(54) WHEEL RIM

(71) Applicant: Kornelius Wiebe, Wellington, TX (US)

(72) Inventor: Kornelius Wiebe, Wellington, TX (US)

( * ) Notice: Subject to any disclaimer, the term of this patent is extended or adjusted under 35 U.S.C. 154(b) by 0 days.

(21) Appl. No.: 14/257,614

(22) Filed: Apr. 21, 2014

(51) Int. Cl.
| | | |
|---|---|---|
| *B05B 3/00* | (2006.01) | |
| *B60B 25/00* | (2006.01) | |
| *B60B 1/14* | (2006.01) | |
| *A01G 25/09* | (2006.01) | |
| *B60B 15/18* | (2006.01) | |
| *B60B 1/10* | (2006.01) | |
| *B60B 15/02* | (2006.01) | |

(52) U.S. Cl.
CPC ............ *B60B 25/00* (2013.01); *A01G 25/09* (2013.01); *A01G 25/092* (2013.01); *A01G 25/095* (2013.01); *A01G 25/097* (2013.01); *B60B 1/10* (2013.01); *B60B 1/14* (2013.01); *B60B 15/02* (2013.01); *B60B 15/18* (2013.01); *B60B 2900/551* (2013.01)

(58) Field of Classification Search
CPC ... B60B 1/10; B60B 15/18; B60B 2900/551; B60B 15/02; B60B 25/00; B60B 1/14; A01G 25/095; A01G 25/092; A01G 25/09; A01G 25/097

USPC ....... 239/723, 726, 728, 731, 735, 741, 742, 239/744; 305/4; 301/43, 52, 53
See application file for complete search history.

(56) References Cited

U.S. PATENT DOCUMENTS

| | | | | |
|---|---|---|---|---|
| 652,650 | A | * 6/1900 | Stone | .................. B60B 15/02 301/52 |
| 1,195,066 | A | * 8/1916 | Morton | .................. B60B 15/02 301/52 |
| 1,461,951 | A | * 7/1923 | Tuttle | .............................. 301/53 |
| 2,106,135 | A | * 1/1938 | Henry | .............................. 301/52 |
| 3,245,595 | A | 4/1966 | Purtell | |
| 3,690,343 | A | * 9/1972 | Crane | ........................... 239/731 |
| 3,729,140 | A | * 4/1973 | Wagner | .................. A01G 25/09 239/726 |
| 4,074,783 | A | * 2/1978 | Arndt et al. | .................. 239/728 |
| 5,226,690 | A | 7/1993 | Clark et al. | |
| 5,451,001 | A | * 9/1995 | Kumm | ........................ 239/726 |
| 5,809,915 | A | 9/1998 | Jess et al. | |
| 6,428,113 | B2 | 8/2002 | Dietrich | |
| 8,657,215 | B1 | * 2/2014 | Blum | ........................... 239/726 |

* cited by examiner

*Primary Examiner* — Steven J Ganey

(57) ABSTRACT

Various aspects of a wheel rim for use with agricultural equipment, such as an irrigation system are disclosed. In one example, the wheel rim includes first and second concentric rim plates separated by a distance, each of the first and second concentric rim plates having an outer surface. The wheel rim further includes a plurality of cross members spanning the distance.

17 Claims, 4 Drawing Sheets ive diagram

WHEEL RIM

TECHNICAL FIELD

This application is directed, in general, to wheel rims and, more specifically, to a wheel rim for use with agricultural equipment having multiple concentric rim plates.

BACKGROUND

Agricultural equipment, such as irrigation systems, are used in a variety of climates and conditions. Irrigation systems, for example are designed to work in a variety of earth terrains and surfaces, most commonly, dirt and mud.

One example of an irrigation system includes a number of pipe spans connected to each other, having wheels mounted at various positions along the pipe span. The wheels move the irrigation system around a crop and recirculate about the same point at various intervals, depending on the crop size, but in many cases, the interval is usually measured in days. As the irrigation system rotates around the crop the crop begins to accumulate moisture both from the water delivered by the irrigation system, but also from natural sources. As the moisture beings to accumulate, the wheels tend to sink into the earthen surface such as mud and tend to push the mud forward. As a result, mud tends to accumulate, and in turn the ruts of the wheel grow deeper and deeper each time the irrigation system rotates about the crop.

Accordingly, what is needed is an irrigation system and more particularly a wheel design that can handle the mud better.

SUMMARY

Disclosed herein are various aspects of wheel rims. In one embodiment, there is a wheel rim comprising first and second concentric rim plates separated by a distance, each of the first and second concentric rim plates having an outer surface. The wheel rim further comprises a plurality of cross members spanning the distance.

An irrigation system is disclosed in another aspect of the present disclosure. The irrigation system, in this aspect, comprises a span connected with a water source, the span comprising at least one section of piping having sprinkler heads connected thereto. The irrigation system further comprises two wheels, each of the wheels comprising a wheel rim. The wheel rim comprises first and second concentric rim plates separated by a distance, each of the first and second concentric rim plates having an outer surface. The wheel rim further comprises a plurality of cross members spanning the distance. The irrigation system also comprises a drive system coupled to at least one of the two wheels.

BRIEF DESCRIPTION

Reference is now made to the following descriptions taken in conjunction with the accompanying drawings, in which.

DETAILED DESCRIPTION

Agricultural equipment is used in various weather conditions and terrain surfaces. Commonly, surface terrain and conditions of crops irrigated by continuously moving sprinkler irrigation systems, such as, e.g. center-pivot irrigation systems that rotate about the crop, tend to become muddy and soft. As a result, as typical irrigation systems continue to circle about the crops, the wheels sink and push through the mud, which causes the mud to accumulate and get deeper and deeper such that each time the wheel passes around the crops, the mud is deeper and deeper. Generally, the wheels are unable to continue moving at a same pace through the deeper mud because the wheel will generally sink further into the mud as the wheel pushes through. In addition, as the wheel encounters more and more mud, the resistance increases, which puts added stress and strain on each wheel, motor, and drive train of the irrigation system. As a result, certain wheels for equipment such as irrigation systems have tended to be configured with larger circumferences to accommodate sinking into and pushing more and more mud. However, while the larger circumference wheels are able to push through the mud and still maintain a minimum height for delivery of water to the crops, the larger circumference wheels still encounter increased resistance and therefore do not alleviate the stress and strain on each wheel, motor, and drive train of the irrigation system.

The present disclosure relates to a wheel rim for use with wheels for agricultural equipment, such as an irrigation system, the wheel rim configured to engage the earthen surface, such as mud, yet allow the mud to pass through the wheel rims rather than accumulate in front of the wheel rim. By allowing the mud and earth to pass through the wheel rims rather than accumulate in front, a wheel having the disclosed wheel rims may maintain a relatively similar pace through an irrigation cycle and still maintain a needed minimum height above the crop, thus more effectively irrigating the crop.

Figure 1:
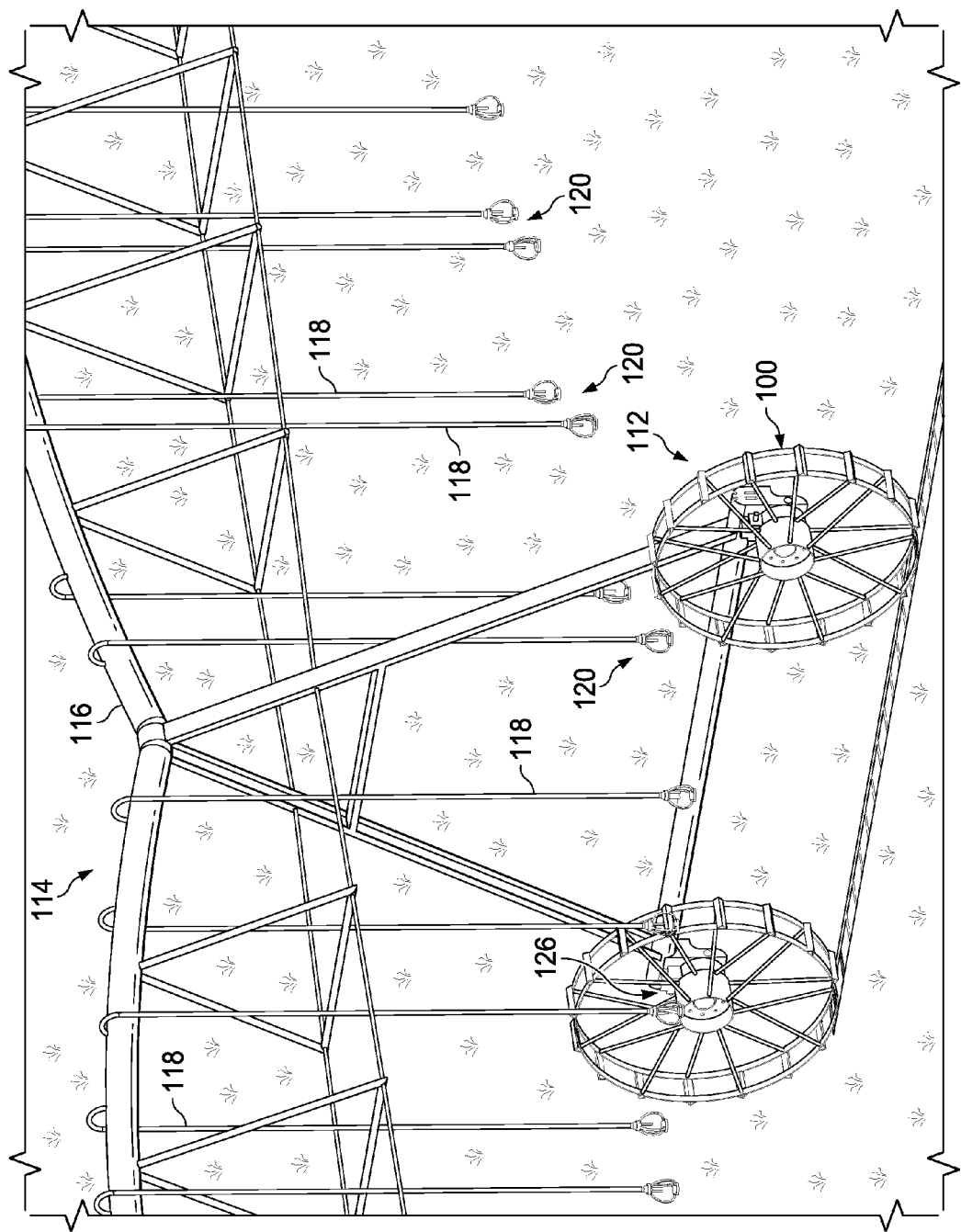
FIG. 1 is an environmental view of an agricultural sprinkler system employing one embodiment of a wheel rim according to the present disclosure.

Referring now to the drawings and more specifically to FIG. 1, there is shown one embodiment of a wheel rim 100 being used on wheels 112 of an irrigation system 114. The irrigation system 114 comprises at least one span 116 which connects to a water source. In one embodiment, the span 116 has drops 118 with sprinkler heads 120 on the distal ends thereof. In some embodiments, the drops 118 may extend downward from the span 116 as shown, but other configurations of the span 116 and pipes 118 may be utilized, depending on the crop type and other considerations. For example, in one other embodiment, the sprinkler heads are located directly on the span 116. At least one drive system 126 may be coupled onto at least one wheel 112 of the irrigation system 114 for driving one or more of the wheels 112 to move the irrigation system 114 around the crops.

Figure 2:
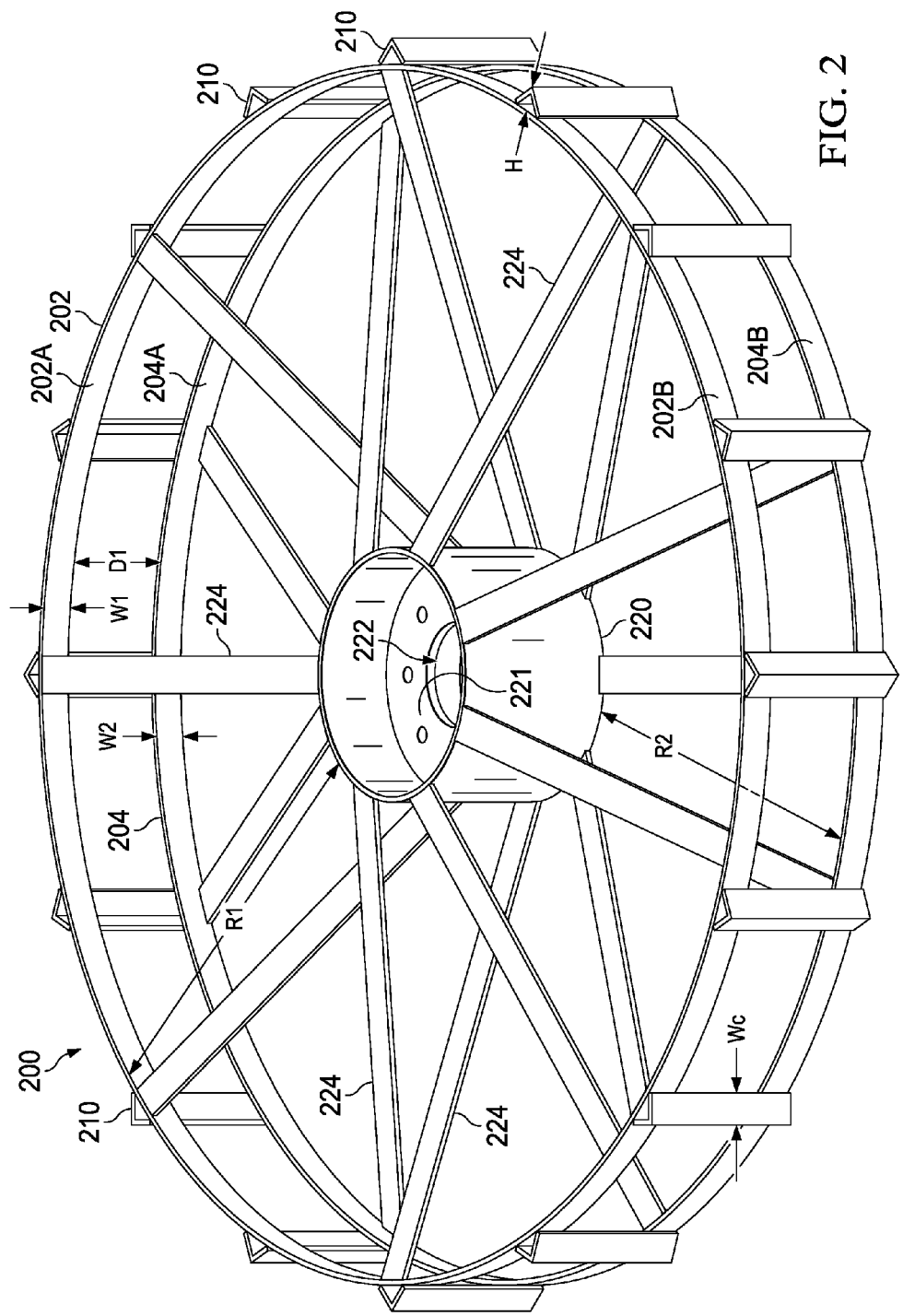
FIG. 2 is a perspective view of one embodiment of a wheel rim according to the present disclosure.

Referring now to FIG. 2, there is shown another embodiment of a wheel rim 200. The wheel rim 200 comprises a first rim plate 202 and a second rim plate 204, which is concentric with the first rim plate 202. The first rim plate 202 and second rim plate 204 are separated by a distance D1, which may vary in size according to the type of agricultural equipment for which the wheel rim 200 may be utilized. The opening created by distance D1 enables mud to move through and disperse through said opening such that the mud does not accumulate as the wheel rim 200 moves through and engages the mud. The first rim plate 202 and second rim plate each have an inner surface 202A and 204A respectively, and an outer surface 202B and 204B, respectively.

A plurality of cross members 210 are positioned about the wheel rim 200. The cross members 210 are configured to span distance D1. In another embodiment, the cross members 210 are configured to couple to the outer surfaces 202B and 204B of the first rim plate 202 and second rime plate 204. As the wheel rim 200 rotates, the cross members 210 engage the mud and sink; however, as the cross members 210 engage and sink into the mud, the mud is pushed through the opening created by distance D1 and disperses rather than accumulating in front of the wheel rim 200. In the embodiment shown in FIG. 2, the cross members 210 are configured having an angled edge such that the cross members 210 may engage and sink into the mud at least height H of the cross member 210 and also may provide better traction through the mud and various other surfaces and textures. The cross members 210 may also comprise various other shapes and configurations such as a solid triangular member, semi-circular edge, a flat planar member, a beveled edge, and other configurations suitable for engaging earth surfaces such as mud yet enable the mud to pass through and disperse.

The first rim plate 202 has a first width W1 and the second rim plate 204 has a second width W2. In this embodiment, W1 is about equal to W2; however, certain embodiments may be realized wherein varying sizes having varying radii and circumferences and widths may be utilized. Likewise, although the wheel rim 200 is shown having the first rim plate 202 with a radius R1 and the second rim plate 204 with a radius R2, wherein R1 is about equal to R2, some embodiments may utilize different sizes of rim plates having varying radii and thus varying circumferences. Similarly, the surfaces of cross members 210 may be configured having a width Wc which may be configured according to the width of the first rim plate 202 and second rim plate 204. However, if configured as a flat planar member, width Wc may be greater and may be configured having a greater height H for deeper engagement with the mud. Various ratios of size, width, and height of the cross members 210 in relation to the first rim plate 202 and second rim plate 204 may be configured according to various crop types and configurations.

While wheel rim 200 is shown having the cross members 210 positioned at substantially equal intervals about the outer surfaces 202B and 204B of the first rim plate 202 and second rim plate 204, the cross members 210 may be configured and spaced at varying intervals. Likewise, the quantity of cross members 210 may vary depending on the radii R1 and R2 of the first rim plate 202 and second rim plate 204. Further, the number of cross members 210 may be greater or lesser in number according to the terrain and crop type.

The wheel rim 200 may further comprise a hub 220 at a center of the concentric first wheel rim 202 and second wheel rim 204. The hub 220 may comprise an aperture 222 by which the wheel rim 200 may be mounted onto an irrigation system and likewise for attachment of a drive system, motor, and the like, or may be mounted onto piping of an irrigation system if the piping is configured to run through the center of the wheels such that the piping doubles and an axle between wheels of an irrigation system.

The concentric first rim plate 202 and second rim plate 204 may be connected with the hub 220 via a plurality of spokes 224. The spokes 224 may be configured at alternating angles relative to the hub 220 such that every other spoke 224 is coupled with the first rim plate 202 and likewise the intermediate spoke 224 is coupled with the second rim plate 204. By alternating the spokes 224, even more space is created within the wheel rim 200 for dispersing the mud passed and pushed therethrough. The spokes 224 may align with the cross members 210 as shown in FIG. 2, but as shown in the embodiment of the wheel rim 100 in FIG. 1, the alignment and positioning of the spokes may be independent of the placement of cross members 210. Further, the size and angle of the spokes 224 may vary, whereas the spokes 224 may be configured as relatively flat planar members as shown in FIG. 2, but may also be configured with a cylindrical shape as shown in FIG. 1.

The wheel rim 200 and components thereof may be constructed using a variety of materials and fabricating processes. The wheel rim 200 may comprise metals such as aluminum, iron, steel—either hot rolled or cold rolled, stainless steel, and the like such that the wheel rim 200 may support a load from the surrounding components of an attached irrigation system, yet be lightweight for portability and energy efficiency. The wheel rim may 200 may also be fabricated from high strength polymers and other materials configured for strength and durability. The cross members 210 may be coupled onto the first rim plate 202 and second rim plate 204 via welding, fasteners, and other suitable fastening processes known to those skilled in the art of manufacturing industrial and agricultural equipment. Likewise, if constructed from polymers, such as Poly (vinyl chloride), the first rim plate 202, second rim plate 204, and cross members 210 may be constructed using fasteners, couplings, and other suitable fastening processes suitable on industrial and agricultural equipment.

In some embodiments, wheel rim 200 may comprise 16 spokes 224. In other embodiments, the number of spokes may correspond with the radius of the largest rim plate. The ratio of spokes to radius may be within a range of about 0.4 to about 0.8. In accordance with the disclosure, such a ratio of spokes to radius provides superior strength, weight and cost attributes. Outside of such a ratio of spokes to radius, at least one of the strength, weight or cost will fall short. In the given embodiment of FIG. 2, the radius R1 is 25 inches, and 16 spokes 224 have been used, resulting in a ratio of spokes to radius of about 0.64 spokes per inch of radius R1. For larger wheel rims 200, additional spokes 224 may be required, and for smaller wheel rims 200, fewer spokes 224 may be required. The spokes 224 may be constructed in some embodiments using ⅝" cold rolled steel rod. The rod size may increase or decrease in size, such as, e.g., the rod size may increase to between ¾" to 1" in size for heavy duty applications for which the wheel rim 200 may be used, and other materials such as hot rolled steel or aluminum may also be used.

In some embodiments, first rim plate 202 and second rim plate 204 may be constructed using ⅜"×2" hot rolled steel flat bar. Accordingly, the size and/or thickness of the flat bar may increase or decrease according to the application or terrain for which the wheel rim 200 may be used. In other embodiments, A cold rolled steel material may be used instead of hot rolled steel. The cross members may be fabricated using a 2" by 2" by 3/16" hot rolled steel angle iron, but similar to the material for the first rim plate 202 and second rim plate 204, a wider and/or thicker material may be used or a cold rolled material.

The hub 220 may comprise a 12¾" well casing having an inner hub plate 221 of ⅜" hot rolled steel flat plate. Similar to the radius and size of the first rim plate 202 and second rim plate 204, the size, thickness, and width of the hub and inner hub plate 221 may vary according to an irrigation system on which the wheel rim 200 may be used and also according to the application or terrain for which the wheel rim 200 may be used.

Figure 3:
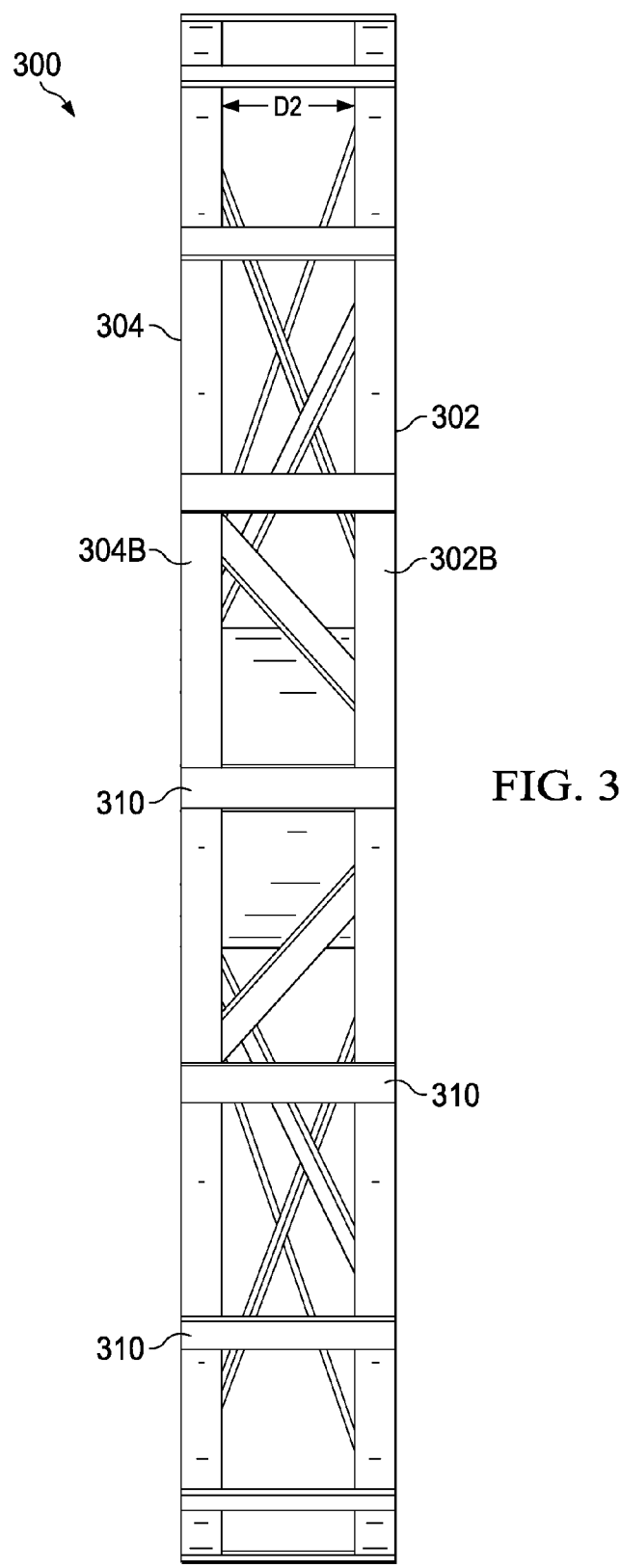
FIG. 3 is an end view of another embodiment of a wheel rim according to the present disclosure.

Referring now to FIG. 3, there is shown another embodiment of a wheel rim 300 according to the present disclosure. Wheel rim 300 is constructed similarly to wheel rim 200 and having similar components and accordingly likewise comprises a first rim plate 302 and a second rim plate 304. The first rim plate 302 and second rim plate 304 are separated by a distance D2 and have cross members 310 coupled on outer surfaces 302B and 304B thereof. The cross members 310 are configured having a flat planar surface, wherein the cross members may be fabricated having similar dimensions as first rim plate 302 and second rim plate 304, such as, e.g., a similar thickness and height.

Figure 4:
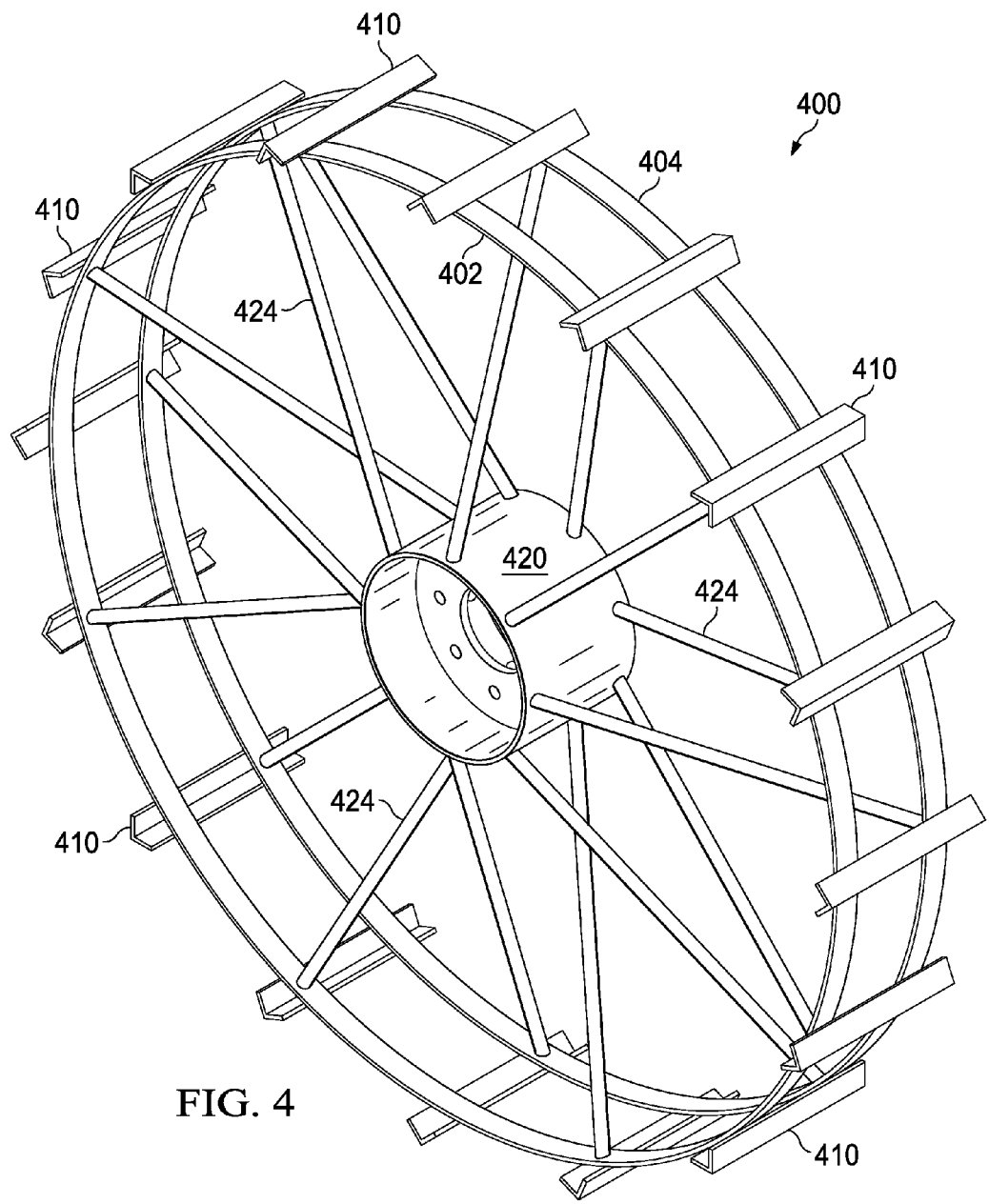
FIG. 4 is a perspective view of yet another embodiment of a wheel rim according to the present disclosure.

Referring now to FIG. 4, there is shown another embodiment of a wheel rim 400 according to the present disclosure. Wheel rim 400 may include features similar to wheel rims 200 and 300 and may likewise be constructed using similar materials, dimensions, and ratios. Wheel rim 400 comprises a first rim plate 402 and a second rim plate 404. The first rim plate 402 and second rim plate 404 have cross members 410 coupled thereonto. In this embodiment of wheel rim 400, the cross members 410 extend beyond the outer edges of the first rim plate 402 and second rim plate 404, which may provide additional support or traction, among other benefits. Spokes 424 are formed having a rounded, cylindrical shape and are coupled between wheel hub 420 and the first rim plate 402 and second rim plate 404. In this embodiment, every other spoke 424 couples to the wheel hub 420 and the first rim plate 402 and likewise the alternating spoke 424 couples to the wheel hub 420 and the second rim plate 404.

Those skilled in the art to which this application relates will appreciate that other and further additions, deletions, substitutions and modifications may be made to the described embodiments.

What is claimed is:

1. A wheel rim, comprising:
    first and second concentric rim plates separated by a distance, each of said first and second concentric rim plates having an outer surface, wherein said first and second concentric rim plates are parallel and substantially within the same plane;
    a plurality of cross members spanning said distance and positioned entirely above said outer surface of each of said first and second concentric rim plates; and
    a hub, wherein said first and second concentric rim plates are coupled to said hub via a plurality of spokes, said plurality of spokes coupled to an inner surface of each of said first and second concentric rim plates;
    wherein said plurality of spokes are configured to extend outward from a center of said hub at alternating angles such that said plurality of spokes couples alternatively to only one of said first and second concentric rim plates.

2. The rim according to claim 1, wherein the plurality of cross members are coupled to said outer surface of each of said first and second concentric rim plates, and further wherein each of said first and second concentric rim plates has a width.

3. The wheel rim according to claim 2, wherein said distance is at least two times said width.

4. The wheel rim according to claim 2, wherein said distance is substantially similar to said width.

5. The wheel rim according to claim 2, wherein said distance is about three times said width.

6. The wheel rim according to claim 2, wherein each of said plurality of cross members has a width substantially similar to said width of each of said first and second concentric rim plates.

7. The wheel rim according to claim 2, wherein each of said plurality of cross members has a width greater than said width of each of said first and second concentric rim plates.

8. The wheel rim according to claim 2, wherein said width is greater than said width of each of said first and second concentric rim plates.

9. The wheel rim according to claim 1, wherein said plurality of cross members are positioned at substantially similar intervals about said first and second concentric rim plates.

10. The wheel rim according to claim 1, wherein each of said plurality of cross members is configured having an angled surface that protrudes upward from said outer surface of said first and second concentric rim plates.

11. The wheel rim according to claim 1, wherein each of said plurality of cross members comprises a substantially flat surface.

12. The wheel rim according to claim 1, wherein said first concentric rim plate has a first width and said second concentric rim plate has a second different width.

13. An irrigation system, comprising:
    a span connected with a water source, said span comprising at least one section of piping having sprinkler heads connected thereto;
    two wheels, each of said wheels comprising a wheel rim comprising:
        first and second concentric rim plates separated by a distance, each of said first and second concentric rim plates having an outer surface;
        a plurality of cross members spanning said distance and positioned entirely above said outer surface of each of said first and second concentric rim plates; and
        a hub, wherein said first and second concentric rim plates are coupled to said hub via a plurality of spokes, said plurality of spokes coupled to an inner surface of each of said first and second concentric rim plates;
        wherein said plurality of spokes are configured to extend outward from a center of said hub at alternating angles such that said plurality of spokes couples alternatively to only one of said first and second concentric rim plates; and
    a drive system coupled to at least one of said two wheels.

14. The irrigation system according to claim 13, wherein each of said plurality of cross members is configured having an angled surface that protrudes upward from said outer surface of said first and second concentric rim plates.

15. The irrigation system according to claim 13, wherein said plurality of cross members are positioned at substantially similar intervals about said first and second concentric rim plates.

16. The irrigation system according to claim 13, wherein each of said plurality of cross members has a width and wherein said width is substantially similar to a width of each of said first and second concentric rim plates.

17. The irrigation system according to claim 13, wherein said plurality of cross members are coupled to said outer surface of each of said first and second concentric rim plates.

* * * * *